L. O. LEGAN.
SHIELD OR AUXILIARY TIRE.
APPLICATION FILED JUNE 29, 1920.
1,412,122.                                Patented Apr. 11, 1922.
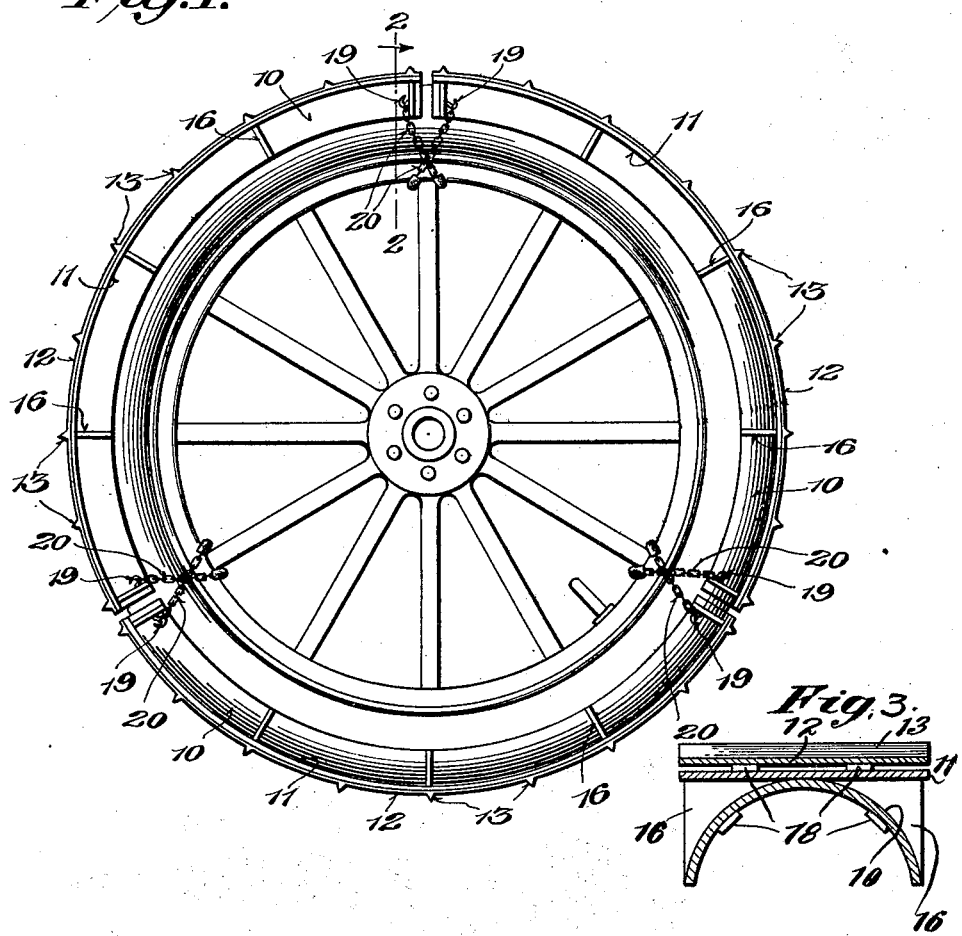

UNITED STATES PATENT OFFICE.

LUSK O. LEGAN, OF SAN ANTONIO, TEXAS.

SHIELD OR AUXILIARY TIRE.

1,412,122.  Specification of Letters Patent.  Patented Apr. 11, 1922.

Application filed June 29, 1920. Serial No. 392,865.

*To all whom it may concern:*

Be it known that I, LUSK O. LEGAN, a citizen of the United States, residing at San Antonio, in the county of Bexar and State of Texas, have invented certain new and useful Improvements in Shields or Auxiliary Tires, of which the following is a specification, reference being had therein to the accompanying drawings.

This invention provides a sectional metallic shield or auxiliary tire arranged to seat over a pneumatic, cushion, solid, or other form of tire, tread, or peripheral portion of a wheel, to afford protection therefor and means to prevent the wheel from slipping under traction efforts.

It is an object of the invention to provide a tire of that sort of novel and advantageous formation, having a substantially flat tread portion, which can be placed on and removed from a wheel with facility without jacking up the wheel.

More specifically the invention is directed to formation of the tire in such manner that it will be strong, its parts easily assembled in manufacture, and generally be efficient and satisfactory in use.

Among the features of the invention are those relating to the means for giving anti-slipping characteristics to the tread, and means for bracing and attaching the tread to the part that immediately is associated with the peripheral portion of a wheel.

When read in connection with the description herein, the formation and arrangement of parts of the invention will be apparent from the accompanying drawings, forming part hereof, wherein embodiments of the invention are disclosed, for purposes of illustration.

While the disclosures herein exemplify what now are considered to be preferable embodiments of the invention, it is to be understood that it is not the intention to be limited necessarily thereto in interpretation of claims, as modifications and adaptations within the limits of the claims can be made without departing from the nature of the invention.

Like reference-characters refer to corresponding parts in the views of the drawings, of which—

Fig. 1 is a side elevation of the shield or auxiliary tire of this invention associated with a wheel;

Fig. 2 is a view of a brace before bending the lugs; and

Fig. 3 is a transverse sectional view showing the brace in place.

Having more particular reference to the drawings, 10 designates a segmental shoe forming part of a section of the shield or auxiliary tire. It is arcuate circumferentially and transversely to conform substantially to the shape of the tire or other peripheral portion of the wheel on which it is placed, and preferably it is made of stout sheet metal.

The shoe has on its outside a tread that is substantially straight transversely and curved circumferentially in an arc corresponding to that of the shoe—it is a so-called flat tread. The tread includes a plate 11, which contacts with and is secured to the shoe in a manner hereinafter described, and an outer plate 12. The two plates are secured together by welding, riveting, or in any other suitable manner.

Before being associated with plate 11, the plate 12 is crimped transversely at intervals to afford ribs 13, which protrude from the tread surface, to prevent or reduce liability of slipping of the wheel under traction effort.

The shoe and tread may be secured together, if desired, by welding at places of contact, by rivets, or in any other suitable manner. They may be connected solely by substantially triangular braces 16 located at intervals on each side in the angles formed by the shoe and plate 11, or they may be associated together in both ways. The braces support the marginal portions of the tread and maintain the tread in a position substantially parallel to the axis of the wheel.

A suitable form of means for bracing and holding together the shoe and tread is shown by Figs. 2 and 3. The brace there shown is of stout metal, and it has bendable lugs 18 extending from its shoe and tread abutting sides. For such a brace the plate 11 and shoe are formed with slots or openings into which the lugs are passed and bent down flat against the surfaces thereof opposite to the brace, as seen in Fig. 3. A lug would be engaged thus with the plate 11 before the plate 12 is associated therewith.

A shield or tire including sections formed as hereinbefore described is adapted particularly for use on a wheel equipped with pneumatic or other tires that are arcuate in cross section. A sufficient number of such sections are provided to extend around and to cover the tread portion of the tire, except that they should be of such length that there will be a small space between the abutting ends. That is to allow for variance of air pressure in and for compression of a pneumatic tire under the influence of load, for compression of a cushion tire or the like, and for expansion and contraction of metal resulting from changes in temperature.

The braces adjacent to the ends of the sections have on each side thereof hooks 19 or other suitable means for connection with flexible members 20, such as chains, which are disposed from one side to the other around the tire or the like, the rim, and the felly of the wheel, to hold the sections in place. Preferably the sections for a given wheel are of such dimensions circumferentially that their ends abut opposite to the felly ends of the wheel-spokes, and the chain of each end is disposed and drawn tightly against the opposite side of the adjacent spoke. Thus the chains of each abutting pair of ends cross, as seen in Fig. 1, and by that arrangement the sections are prevented from slipping circumferentially on the wheel.

Having thus described my invention, what I claim as new, and desire to secure by Letters Patent, is—

1. A tire section comprising a shoe arranged to seat on a peripheral portion of a wheel, a substantially flat tread on said shoe, and metallic braces interposed between said shoe and tread supporting marginal portions of the latter, said braces having lugs extending through said shoe and tread and bent down flat thereagainst.

2. A tire section comprising a shoe arranged to seat on a peripheral portion of a wheel, an inner plate on said shoe, metallic braces interposed between said shoe and plate supporting marginal portions of the latter, said braces having lugs extending through said shoe and plate and bent down flat thereagainst, and an outer tread-plate secured to said inner plate over the brace-lugs associated therewith.

3. A tire section comprising a shoe arranged to seat on a peripheral portion of a wheel, a substantially flat tread member on said shoe including an inner plate and an outer plate attached thereto having anti-slipping protuberances extending therefrom, and metallic braces between said shoe and inner plate supporting marginal portions of the latter, said braces having lugs extending through said shoe and inner plate, some of which are bent down flat against the inner plate under said outer plate.

In testimony whereof I affix my signature.

LUSK O. LEGAN.